United States Patent Office 2,989,915
Patented June 27, 1961

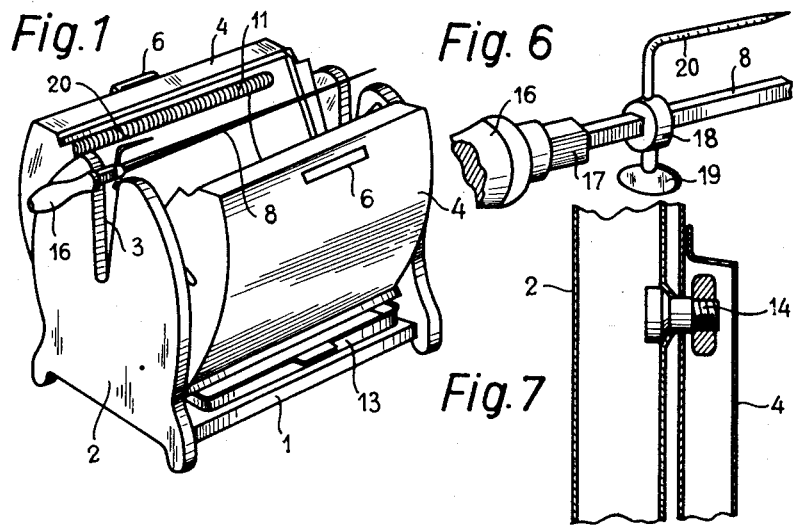
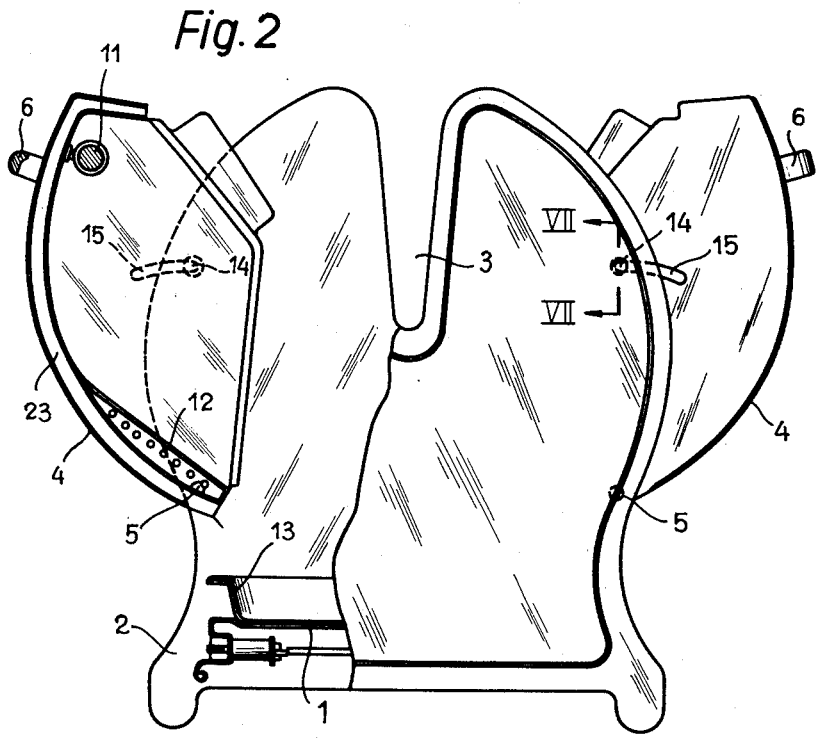

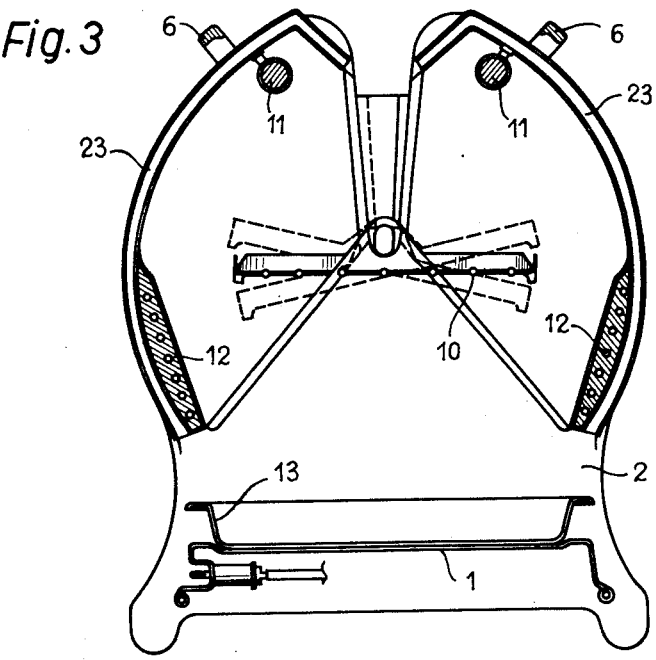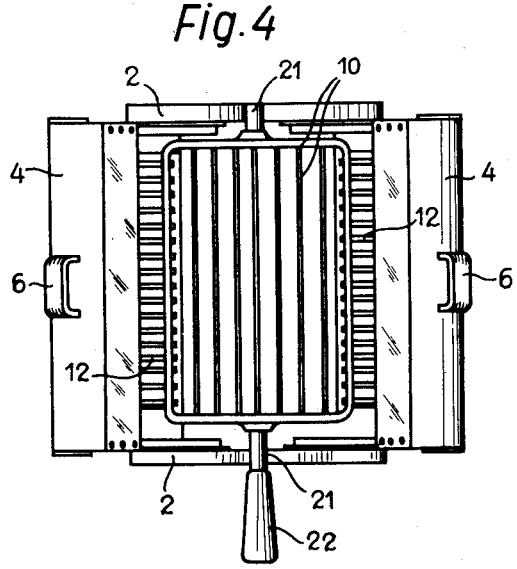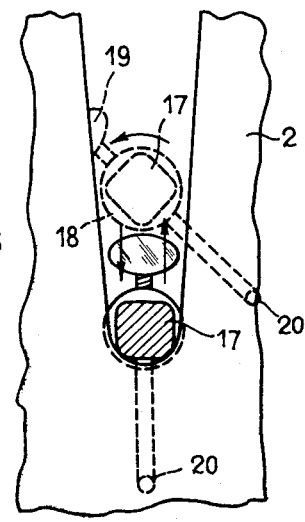

2,989,915
APPARATUS FOR COOKING FOOD OF THE GRILL PAN TYPE
Agostino Lonzi, 13, Via Mario Pagano, Florence, Italy
Filed Nov. 18, 1958, Ser. No. 774,752
Claims priority, application Italy Nov. 22, 1957
5 Claims. (Cl. 99—391)

This invention relates to a device for cooking food of the grill pan type by direct heat absorption in a free surrounding in which convective air and vapour streams can be formed.

The improved apparatus chiefly comprises a supporting structure having a sole plate, two stationary head portions and a pair of side walls articulated to the head portions confining a compartment in the middle of which the viand to be cooked is arranged, the side walls being equipped with heating means.

The means for supporting viands while cooking comprises a spit and a grid which are interchangeable and can be inserted into and removed from the cooking compartment by spreading out the side walls.

The cooking compartment is preferably heated by electric resistors carried by the side walls positioned to radiate heat from the top and the bottom towards the viands being cooked without the latter having to be displaced from their support.

The cooking compartment is open at the top and bottom to afford air circulation and escape of any vapours evolved on cooking.

Further characteristic features and advantages of this invention will be understood from the appended detailed description referring to the accompanying drawings which show an embodiment thereof by way of a non-limiting example.

FIGURE 1 is a perspective view of the apparatus in its open condition for introducing and removing viands, FIGURE 2 is a part-sectional front view of the apparatus in its open condition, FIGURE 3 is a cross-sectional view of the apparatus in its closed condition, FIGURE 4 is a plan view of the apparatus in its open condition and FIGURES 5 to 7 show details of the apparatus.

The supporting structure of the apparatus comprises a sole plate 1 having fast therewith two head portions 2 formed with a slot 3 extending from the top to the middle of the head portions to form seats for retaining the viand's supporting means.

The head portions have articulated to their opposed sides two curved side walls 4 capable of being swung about pivots 5 to perform an angular movement over a limited width between their end positions shown in FIGURES 2 and 3.

The angular movements of the side walls are limited by pins 14 secured to the head portions cooperating with slits 15 cut in the side walls.

The side walls 4 and stationary head portions 2 confine a central compartment which is apertured at a location between the lower edges of the side walls and sole plate 1. The top edges of the side walls are held apart in the closed position also, in order to leave a wide opening in the top of the compartment.

The viands may be directly supported by a stem 8 acting as a spit, or by a grid 10, as desired. The spit is provided at one end with a handle 16 of a heat insulating material and a prismatic log 17 to prevent rotation of the spit with respect to the seats 3 in the head portions into which it is fitted. The spit has slipped thereon a sleeve 18 which can be secured in position by means of a winged screw 19 and carries a nail 20 extending parallel with the spit in order to retain the viands and keep them against rotating with respect to the spit.

The spit may be angularly orientated with respect to the cooking compartment by slightly raising it within its seats 3 which flare upwardly to an extent such that the prismatic log 17 may be rotated (FIGURE 5).

The grid 10 is provided at its ends with two prismatic hubs 21 and a handle 22 of heat insulating material. The hubs 21 are engaged by the seats 3 in the head portions and allow of the grid to move angularly through a limited width as shown in FIGURE 3.

The viands are positioned in the middle of the cooking compartment and may be introduced into or removed therefrom only when the side walls are spread out as shown in FIGURES 1, 2 and 4, which is facilitated by providing the side walls with handles 6 of heat insulating material.

The side walls 4 each carry a pair of heating resistors 11, 12, which are arranged above and beneath, respectively, the space occupied by the viands to be cooked so that heat is radiated from all directions towards the viands.

The lower resistors 12 are arranged laterally of the viands in a position protected from any fat dripping during cooking. Dripping is collected by a tray 13 resting on the sole plate 1 of the supporting structure and easily removable for pouring the dripping therefrom.

The resistors 11 and 12 are controlled by a suitable switch, or preferably, a change-over switch to permit suitable adjustment of the heat intensity by switching all or part of the resistors.

In order to safely protect the heating resistors adjustable screens may be arranged in front thereof, the said screens not being shown on the drawing.

For the purpose of an effective heat insulation between the cooking compartment and surrounding, the side walls are formed with a jacket 23 which may be advantageously filled with an insulating material, such as glass or rock wool.

According to modifications of this invention not shown on the drawings, a small motor can be provided for rotating the spit or supporting grid which is then in the form of a double grill to enclose the viands being cooked. In the latter case the sleeves 17 and 21 on the spit and grid respectively, are made cylindrical.

The advantages of the improved cooking appliance will be obvious. Introduction and removal of the viands is greatly facilitated by the sea-slots 3 and possibility of spreading out the side walls 4 so that manipulation is effected towards and from the top. No preheating is required as distinct from closed ovens, in which heating should be started before positioning the viands, for preheating purposes.

As compared with cooking appliances known heretofore in which the viands are cooked on a grid or on a rotating spit, cooking is accelerated on account of the fact that the viands are continuously exposed to the heating means while when cooking viands on a rotating spit, in addition to requiring rotation, the various parts of the viands cyclically alternate towards the source of heat. The improved cooking appliance totally eliminates smoke, the heating means being laterally arranged and protected. When grilling viands on the grid, the viands need not to be turned over in as much they are uniformly heated from the top and bottom. Cooking takes place in an open compartment similarly to usual cooking on a spit or grill without, however, requiring any particular equipment for movement, heating or draught.

It will be understood that, the principle of the invention being left unaltered, constructional details and embodiments may be widely varied with respects to the examples described and illustrated without departing from the scope of this invention.

What I claim is.

1. All-purpose cooking apparatus for cooking by direct heat absorption food supported by a spit or contained in a retainer with grid shaped walls or the like, comprising a base plate, a pair of upstanding opposite end walls fast with the opposite end portions of the base plate, a pair of curved side walls, said walls being arranged to face each other by their concave surfaces, a pair of coaxial pivots fast with said opposite end walls for rockingly supporting each of said side walls near the lower edge of the latter, said pivots being so arranged as to maintain said lower edges spaced from said base plate, means for limiting the oscillation of said side walls between their closed position in which they define together with said end walls and said base plate the cooking room of the apparatus for containing the food to be cooked and in which the upper edges of said side walls are arranged nearer the longitudinal plane of symmetry of the apparatus than their lower edges and an open position in which said upper edges are arranged farther from said longitudinal plane than said lower edges, food support inside said cooking room, said support having longitudinal extensions supported at the bottom of a V-shaped slot respectively cut in the upper edge of each said end walls, said slots arranged symmetrically with respect to said longitudinal plane of symmetry and each said slot extending to a point on its respective end wall corresponding to about mid-point of said side walls as they are in their closed position, the upper edge of each side wall having an extension arranged substantially at right angles thereto and projecting towards said longitudinal plane of symmetry, the free edges of said extension being spaced to provide a slot connecting said cooking room with the outside, a pair of upper electrical heating elements of rod type each arranged in the corner formed between the upper portion of each side wall and the extension of the latter and a pair of lower electrical heating elements in the form of a plate carrying electrical resistors arranged adjacent lower portions of said side wall and extending from their lower edges to a region situated immediately below the horizontal plane extending through the bottoms of said V-shaped slots when said side walls are in their closed position.

2. All-purpose cooking apparatus for cooking by direct heat absorption food supported by a spit or contained in a retainer with grid shaped walls or the like, comprising a base plate, a pair of upstanding opposite end walls fast with the opposite end portions of the base plate and having at their lower ends legs for supporting the apparatus, a tray bearing on the upper face of said base plate, a pair of curved side walls arranged to face each other by their concave surfaces, a layer of insulating material at the concave surface of each side wall, a pair of coaxial pivots each fast with one of said opposite end walls for rockingly supporting each of said side walls at a region situated near the lower edges of said side walls, said side walls being of a length substantially equalling the spacing of said end walls and defining therewith and with said base plate carrying said tray the cooking room of the apparatus, said pivots being so arranged as to maintain said lower edges spaced from said base plate and the tray carried on the latter, said end walls fast with said base plate and extending upwardly therefrom, said end walls being of an approximately flat circular shape and having equal V-shaped slots cut therein, said slots being symmetrically arranged with respect to the longitudinal plane of symmetry of the apparatus and extending substantially from the upper edge of said end walls to the virtual center of their regions of an approximately circular shape, end plates laterally projecting from the edges adjacent said end walls of said side walls, a pair of pins fast with at least one of said end walls and extending through cooperating arcuate slots cut in the end plates of said side walls adjacent the end wall carrying said pins, said slots having their center of curvature situated on the axis of the pivot carrying the side wall beyond which the end plate extends, in which said slot is cut, the slot length being such as to allow the oscillation of said walls between a closed position in which their upper edges are situated nearer said longitudinal middle plane at each side of the latter than the pairs of coaxial pivots carrying said side walls, and an open position in which their upper edges are situated farther than said pairs of said coaxial pivots, the curvature of said side walls being such that their opposite edges are in front of the marginal portion of the parts of approximately circular shape of the end walls when said side walls are in their closed position, marginal bent-in portions at the upper edges of said side walls reaching within the cooking room and arranged at about right angles with respect to said side walls, said marginal portions being of a length such as to extend to the lateral edges of said V-shaped slots in said end walls providing a longitudinal clearance at the top of the cooking room when said side walls are in their closed position, and forming corners inside the cooking room at both sides of said clearance, a handle of heat-insulating material fast with each of said side walls for displacing them between their closed and open position, a food support inside said cooking room, said support having opposite longitudinal shank portions supported at the bottoms of said V-shaped slots, a pair of electrical heating elements of rod-type arranged substantially at said corners, and a pair of electrical heating elements in the form of plates carrying longitudinal resistors protected against dripping of the fat by screens having transversely arranged slots cut therein, said plates extending from the lower edges of said side walls substantially to the plane extending through the lower ends of said V-shaped slots when the side walls are in closed position.

3. Apparatus as set forth in claim 9, wherein said end plates have their free edges comprising upper parts following the edges of said V-shaped slots and lower parts extending from a region near the bottom of said slots towards lower edges of said side walls when the latter are in their closed position, flaps being provided extending from said upper parts each over the whole width of said slots and each overlapping the flap situated in front for closing said V-shaped slots when said side walls are in their closed position.

4. Apparatus as claimed in claim 1, wherein at least one of said longitudinal extensions on said food support supported at the bottoms of said V-shaped slots are of substantially square form in cross-section, the diagonal dimension of which is such as to substantially prevent rotation thereof in said slots and allow such rotation upon lifting said extension from the bottoms of said slots.

5. Apparatus as claimed in claim 1, wherein said longitudinal extensions on said food support bearing at the bottoms of said V-shaped slots are cylindrical, thereby allowing rotation of the food support during cooking of the food supported by the latter.

References Cited in the file of this patent

UNITED STATES PATENTS

| | | |
|---|---|---|
| 1,134,343 | Mago | Apr. 6, 1915 |
| 2,102,097 | Sherman | Dec. 14, 1937 |
| 2,521,220 | Huntington | Sept. 5, 1950 |
| 2,576,632 | Myers | Nov. 27, 1951 |
| 2,734,708 | Cohn | Feb. 14, 1956 |

FOREIGN PATENTS

| | | |
|---|---|---|
| 136,935 | Australia | June 10, 1948 |